United States Patent
Yang et al.

(10) Patent No.: US 8,387,148 B2
(45) Date of Patent: Feb. 26, 2013

(54) SECURE RIGHTS PROTECTION FOR BROADCAST MOBILE CONTENT

(75) Inventors: Rongzhen Yang, Shanghai (CN); Liang He, Shanghai (CN); Sheldon Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 11/601,308

(22) Filed: Nov. 17, 2006

(65) Prior Publication Data

US 2008/0118061 A1   May 22, 2008

(51) Int. Cl.
*G06F 21/00* (2006.01)
(52) U.S. Cl. .............................. 726/26; 705/51; 713/193
(58) Field of Classification Search .................. None
See application file for complete search history.

(56) References Cited

U.S. PATENT DOCUMENTS

| | | | |
|---|---|---|---|
| 7,185,362 B2 * | 2/2007 | Hawkes et al. ................... 726/4 |
| 7,562,301 B1 * | 7/2009 | Wolff et al. ..................... 715/727 |
| 2002/0012433 A1 * | 1/2002 | Haverinen et al. ............ 380/247 |
| 2002/0169974 A1 * | 11/2002 | McKune ........................ 713/200 |
| 2003/0014655 A1 * | 1/2003 | England et al. ............... 713/200 |
| 2004/0157584 A1 * | 8/2004 | Bensimon et al. ............. 455/411 |
| 2004/0209649 A1 * | 10/2004 | Lord ............................. 455/558 |
| 2005/0130585 A1 * | 6/2005 | Gnuschke et al. ........... 455/3.06 |
| 2005/0136884 A1 * | 6/2005 | Reidelsturz et al. .......... 455/403 |
| 2006/0235796 A1 * | 10/2006 | Johnson et al. ................. 705/44 |

* cited by examiner

*Primary Examiner* — Gilberto Barron, Jr.
*Assistant Examiner* — David Le
(74) *Attorney, Agent, or Firm* — Forefront IP Lawgroup, PLLC

(57) ABSTRACT

Secure rights protection for broadcast mobile content techniques are described in which broadcast content may be securely provided to a mobile device. In one or more embodiments, this is accomplished by requesting and issuing of a content license via a data network based upon a subscriber identity module (SIM) of a mobile device. The license may then be utilized by the mobile device to output content received via a broadcast network.

24 Claims, 5 Drawing Sheets

SECURE RIGHTS PROTECTION FOR BROADCAST MOBILE CONTENT

BACKGROUND

Along with the growth of computing power available for mobile devices (such as mobile handsets, cellular phones, personal digital assistants, and so forth) there is a corresponding growth in the demand for rich content delivery to such devices. However, providers may be reluctant to provide such content without a suitable mechanism for secure right protection. Traditional secure rights techniques such as Conditional Access (CA) used for Pay-Television and Digital Right Management (OMA DRM) in the wireless industry may not be suitable for certain applications such as when mobile content is provided by broadcast content providers. For instance, wireless carriers may not supply CA cards in mobile devices to maintain perceived control over the devices. Likewise, content providers may be unwilling to adopt OMA DRM or other standards used by wireless providers due to perceived loss of profits and/or control over content delivery to the wireless providers.

DETAILED DESCRIPTION

In the embodiments below, techniques to provide secure rights protection for broadcast mobile content are described in which broadcast content may be securely provided to a mobile device. In one embodiment the broadcast content may be configured as broadcast television content. In at least some embodiments, secure rights protection for broadcast mobile content is accomplished by requesting and issuing of a content license via a data network. The license may then be utilized by the mobile device to output content received via a broadcast network. As will be appreciated by one skilled in the art and in view of the discussion below, this can ultimately result in secure rights protection scheme which is feasible and cost effective to set-up and which may have improved performance compared with alternative techniques for content delivery.

Figure 1:
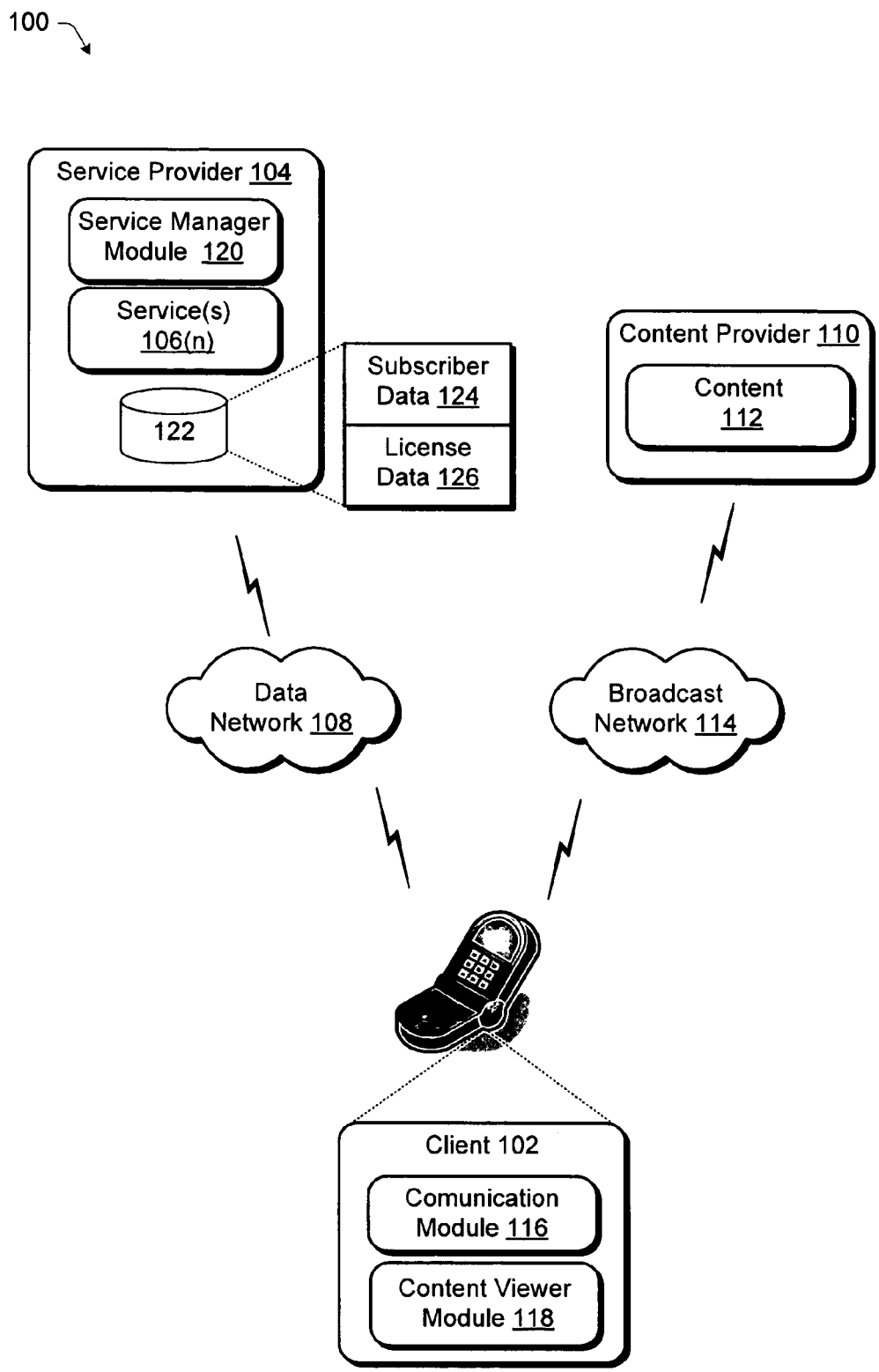
FIG. 1 illustrates an exemplary system in which techniques for secure rights protection of broadcast mobile content may be employed in accordance with one or more embodiments.

FIG. 1 illustrates, generally at 100, an exemplary system in which the described techniques for secure rights protection of broadcast mobile content may be implemented in accordance with one or more embodiments. System 100 includes, in this example, a client 102, which is illustrated as a mobile device. Although client 102 is depicted as a mobile device, it is to be appreciated and understood that any suitable computing device may be utilized without departing from the spirit and scope of the claimed subject matter. Other suitable computing devices may include, by way of example and not limitation, desktop or portable computers, digital cameras, pagers, handheld computers such as personal digital assistants (PDAs), cellular phones, gaming appliances, and the like.

The client 102 may be communicatively coupled with a service provider 104 to receive one or more services 106(n) provided by the service provider 104 over a data network 108. The client 102 may be also communicatively coupled with a content provider 110 to receive content 112 provided by the content provider 104 over a broadcast network 114. In the illustrated implementation, the broadcast network 114 is a network separate from the data network 108. The client 102 may include a communication module 116 which is representative of functionality to manage client 102 use of network connections in the environment 100, e.g., to manage interactions of the client 102 with the service provider 104 and/or content provider 110 via the data 108 and broadcast 114 networks respectively. For instance, communication module may be configured to manage authentication and/or connections of client 102, transactions via the networks 108, 114, communication of data, configuration settings, communication protocols, and so forth. Communication module 116 may be implemented via variety of sub-modules, such as by including distinct modules corresponding to the data 108 and broadcast 114 networks.

Client 102 is also depicted as including a content viewer module 118 which is operable to output content 112 received at the client 102 from the content provider 110 over the broadcast network 114. The content 112 may be configured in a variety of ways including but not limited to video and/or audio content, real-time or near real time broadcast, delayed broadcast, "live" programming, pay-per view, on-demand content, terrestrial or satellite based, and so forth. For example, in an embodiment the content viewer module may be implemented as a television viewer application which may be operated via the client 102 to output content 112 which is configured as broadcast television content. A variety of other suitable content 112 which may be output at client 102 is also contemplated, examples of which include internet pages, games, programming data and so on.

Service provider 104 includes a service manager module 120 which represents functionality to provide services 106(n) via the data network 108, interactions of a client 102 with the services 106(n), manage access to the services 106(n), and so forth. A variety of services 106(n) are contemplated, certain examples of which are further described with respect to FIG. 2. Service provider 104 is illustrated as including storage 122 (for example, a subscriber database) which may maintain a variety of subscriber data 124 (examples include: subscriber ids, corresponding services, billing data, profile data and so forth) and license data 126 (examples include: license requests, issued licenses, client data, cryptographic keys) which alone or in combination may be used to manage subscriber accounts, issue licenses for services, bill for services 106(n) and so forth. In an implementation, service manager module 120 may be configured to manage licensing of one or more client 102 to receive content 112 which is provided by a content provider 110 via a broadcast network 114 in addition to managing the services 106(n). Thus, service provider 104 may be implemented to provide secure rights protection for broadcast mobile content in which licensing of content 112 may be managed by the service provider 104 via data network 108. A content provider 110, separate from the service provider 104, may manage the corresponding content 112 itself and delivery of the content 112 via broadcast network 114.

Figure 2:
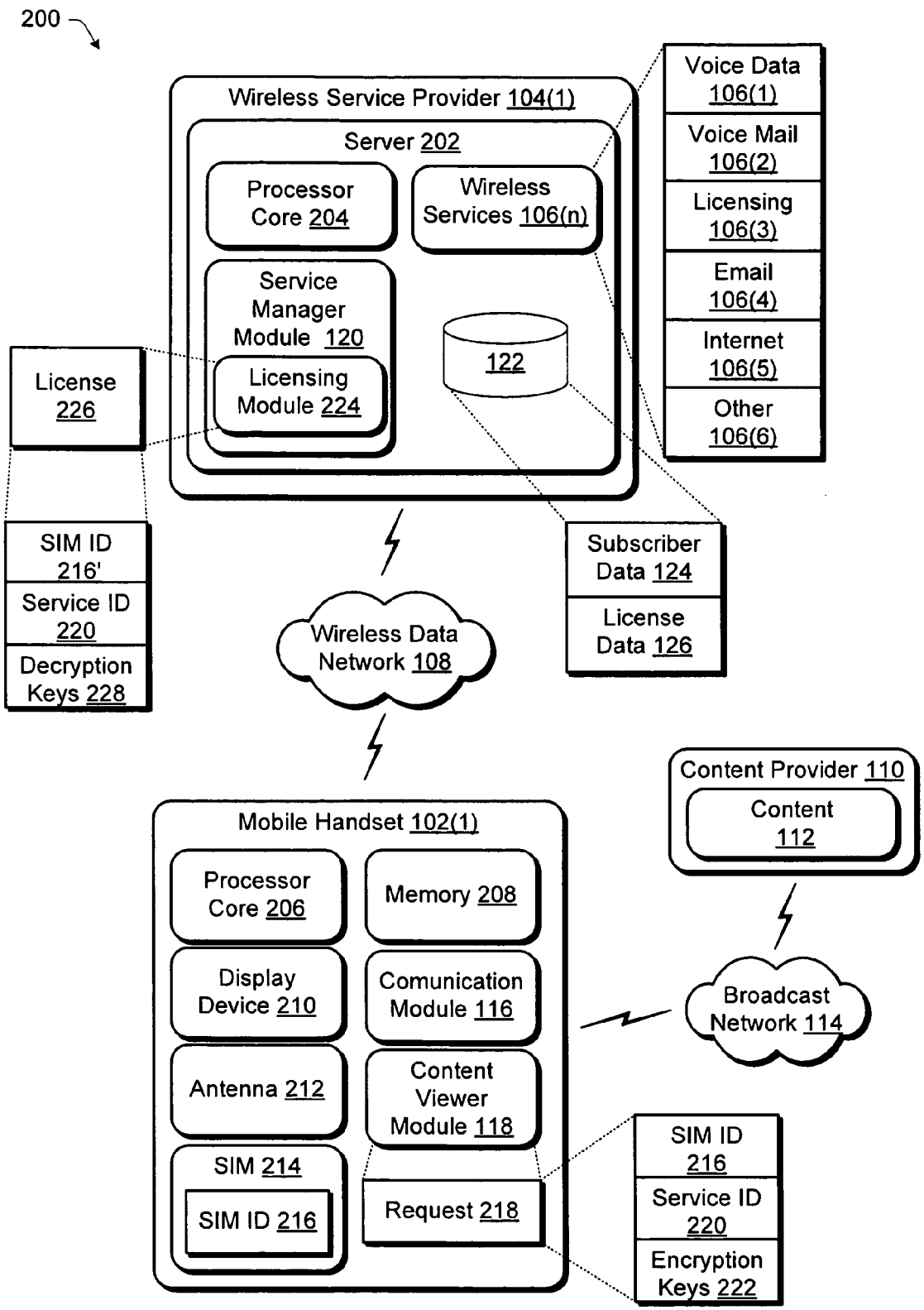
FIG. 2 illustrates an exemplary system showing a client and service provider of FIG. 1 in greater detail in accordance with one or more embodiments.

Service provider 104 may be configured in a variety of ways to provide secure rights protection for broadcast mobile content, further description of which may be found in relation to following discussion of FIG. 2.

FIG. 2 depicts and exemplary implementation 200 of a system showing a client 102 and service provider 104 of FIG. 1 in greater detail. In the depicted embodiment an exemplary client 102 is implemented as a mobile handset and is referred to as mobile handset 102(1). An exemplary service provider 104 is implemented as a wireless service provider and is referred to as wireless service provider 104(1). Wireless service provider 104(1) is configured to provide one or more of a variety of services 106(n) wirelessly over the data network 108. The services 106(n) are illustrated as including a variety of wireless services including but not limited to services for voice data 106(1), voice mail 106(2), licensing 106(3) service, email 106(4), internet 106(5) and so on. A variety of other 106(6) services suitable for a wireless service provider are also contemplated example of which are global positioning satellite (GPS) data, paging, text messaging, push-to-talk, and so forth.

The wireless service provider 104(1) is implemented via a server 202. Although as single server 202 is depicted, alternatively wireless service provider 104(1) may be implemented via a plurality of servers, e.g. a server farm. The server 202 and mobile handset 102(1) are depicted having respective processor cores 204, 206 which each may include includes processing components and related memory systems. Each of the processing core 204, 206 is capable of communicating with various components (some of which are not illustrated here) of the server 202 and mobile handset 102(1) respectively. Each processing core 204, 206 may each further include at least one processor to process data and execute associated modules, and one or more memory devices to store data, modules, and so forth.

Mobile handset 102(1) is further depicted as including a memory 208, which may be configured in a variety of ways such as flash memory, random access memory (RAM), and so forth. A display device 210 is also depicted, which may be a liquid crystal display (LCD) or other suitable display, and one or more one antennas 212, each of which may be configured to transmit and receive signals via one or more of the networks 108, 114. The mobile handset 102(1) may also include other components (not depicted), examples of which are a battery (lithium-ion, nickel cadmium, or other suitable battery) one or more input/output devices such as a cursor control device (stylus, trackball, directional keys), a keyboard, speaker, camera, expansion interface, and so on.

Processors are not limited by the materials from which they are formed or the processing mechanisms employed therein. For example, processors may be comprised of semiconductor (s), transistors (e.g., electronic integrated circuits (ICs)), and/or a variety of other mechanisms. In such a context, processor-executable instructions may be electronically-executable instructions. For example, the processor core 206 may execute one or more modules in response to inputs received from an input/output device such as a cursor control device. Additionally, memory such as memory 208 and/or memory integrated with the processor cores 204, 206 may include a variety of types and combinations of memory, including random access memory (RAM), dynamic random access memory (DRAM), "main" system memory, flash memory, hard disk memory, removable medium memory, computer-readable media, and other suitable types of memory.

In addition, the mobile handset 102(1) includes a subscriber identity module (SIM) 214 which stores at least a SIM identifier (ID) 216. In one embodiment the SIM 214 may be implemented as a permanent or replaceable card which maintains a unique identity for the mobile handset 102(1) via the SIM ID 216. The SIM 214 may permit the mobile handset 102(1) to receive services 106(n) such as voice data service 106(1) from a wireless service provider 104(1). In an embodiment, the SIM 214 and in particular the SIM ID 216 may be used in licensing transactions in which a mobile handset 102(1) seeks a license configured to permit output of content 112 received via the broadcast network 114. In particular, the SIM ID 216 may be provided via network 108 to the wireless service provider 104(1) to obtain a license which enables output of content 112 on the mobile handset 102, such as display of the content 112 via the display device 210

In operation, the content viewer module 118 may be executed, such as via processor core 206 to form a request 218 seeking access to content 112 provided by content provider 110. The content viewer module 118 may also be stored in memory 208 or other suitable memory. Request 218 may be communicated over the data network 108, for instance via the communication module 116. In an implementation, the content viewer module 118 may be integrated with the communication module 116.

In an implementation, the request 218 may include at least the SIM ID 216 which may be used to determine the identity of the requesting mobile handset 102(1) and the integrity of a license issued in response. In addition, the request may package the SIM ID 216 with one or more service identifiers 220 and one or more encryption keys 222. Service identifiers 220 may be configured to indicate particular content 112 being requested, such as a particular item or program, a category, a content type, or a set of associated content (e.g., a programming package). Encryption keys 222 and associated schemes may be used to permit secure communication between entities, such as in a server-client setting. In an implementation, the mobile handset 102(1) may store encryption keys 222, such as in memory 208. In an embodiment, the encryption keys 222 may include a public/private key pair. Those skilled in the art will appreciate that a public key of a key pair may be provided in a request 218 to permit the recipient to encrypt a response using the public key. The client may then use the private key of the key pair to decode the response which was encrypted using the public key. While key pairs are described, a variety of suitable techniques for secure communication may alternatively be employed.

Service manager module 120 is depicted in FIG. 2 as including a licensing module 224, which may be executed by processor core 204 and is also storable in memory of the processor core 206 or server 202. For instance, licensing module 224 may be executed such as via a processor of processor core 204, to provide licensing service 106(3) via the data network 108, such that a client 102 may receive a license 226 corresponding to content 112 provided over a broadcast network 114 by a content provider 110. Thus, licensing module 224 may be representative of a variety of licensing functionality such as functionality to receive and process a request 218 for a license 226, issue a license 226 in response to the request 218, manage license data 126 and so forth.

An exemplary license 226 is depicted as issued via the licensing module 224. The license 226 may be configured to include one or more of a SIM ID 216' (which matches the SIM ID 216 in a corresponding request 218), the service ID 220, and one or more decryption keys 228 which may be used to decrypt content 112 provide via the broadcast network. The license 226 may be communicated to a requesting mobile handset 102(1) via network 108. One technique for secure rights protection of broadcast mobile content involves a comparison of the SIM ID 216' in a license 226 to a SIM ID 216 of a client 102, to ensure that the license 226 is used by a "licensed" client 102. Further discussion of secure rights protection for broadcast mobile content techniques may be found in reference to the following procedures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor. The program code can be stored in one or more computer readable memory devices, e.g., memory 208 or other suitable memory. The features of the techniques described below are platform-independent, meaning that the techniques may be implemented on a variety of commercial computing platforms having a variety of processors.

The following procedures are shown as a set of blocks that specify operations performed by one or more devices and are not necessarily limited to the orders shown for performing the operations by the respective blocks. In the course of discussing the following procedures, reference may be made to the environment depicted in FIG. 1 and the system depicted in FIG. 2.

Figure 3:
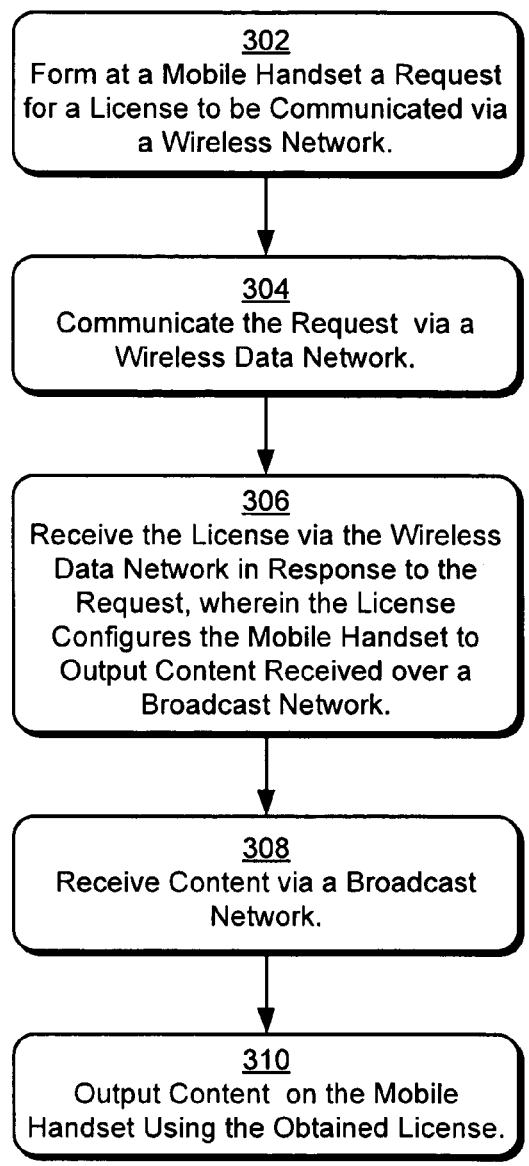
FIG. 3 is a flow diagram of exemplary procedure in which a requested content license is used to output content on a mobile handset in accordance with one or more embodiments.

FIG. 3 is a flow diagram of an exemplary implementation 300 of a procedure in accordance with one or more embodiments. A request is formed at a mobile device to be communicated via a wireless network (block 302). For example, the mobile handset 102(1) of FIG. 2 may execute a content viewer module 118 to form a request 218 corresponding to particular content 112. In this example assume that content 112 is television content which may be provided by a content provider 110 via a broadcast network 114. The content viewer module 118 may be configured to playback television content, e.g. configured as a mobile television player. The request 218 may be configured to seek a license 226 for the corresponding content 112 from a wireless service provider 104(1) via the data network 108. The request is then communicated via the wireless data network (block 304). For instance, the license request 218 may be communicated via data network 108 to a service provider 104(1).

In response to the request, a license is received via the wireless network which configures the mobile handset to output content received over a broadcast network (block 306). For instance, a license 226 may be received by mobile handset 102(1) which includes one or more decryption key 228. The decryption keys 228 may correspond to encrypted content 112 which may be provided by a content provider 110 via the broadcast network 114, and thus may permit a recipient to decrypt the content 112.

Content is received via the broadcast network (block 308) and then output on the mobile handset using the obtained license (block 310). In the previous example the content 112 for which a license 226 is sought may be received at various times such as before, after, and/or during submission of the request 218. The content 112 may, for example, be recorded to a client 102 in encrypted form and then decrypted using a subsequently obtained license 226. Alternatively, content 112 is obtained after the corresponding license 226 is obtained and is decrypted in real-time or near real time as it is received. The content viewer module 118 may be executed via a processor core 206 to utilize the obtained license 226 to decrypt encrypted content 112 and cause playback of the content 112. For instance, the content 112 may be displayed via a display device 210 of the mobile client 102(1). A buffer period may also be used to facilitate smooth playback of the content. A variety of other arrangements are also contemplated.

Figure 4:
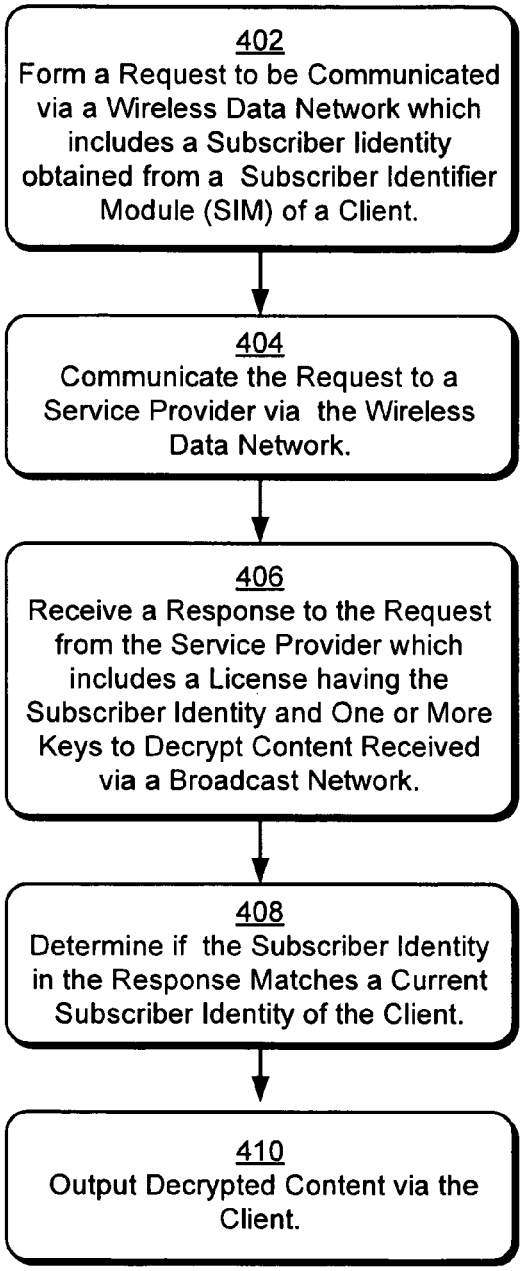
FIG. 4 is a flow diagram of exemplary procedure in which a mobile client obtains a license in response to a request including a SIM number in accordance with one or more embodiments.

FIG. 4 is a flow diagram of an exemplary implementation 400 of a procedure in accordance with one or more embodiments. A request is formed at a mobile to be communicated via a wireless network which includes a subscriber identity obtained from a subscriber identity module (SIM) of a client (block 402). For example a request 218 formed via content viewer module 118 of mobile handset 102(1) in FIG. 2 may package a SIM ID 216, service ID 220 and one or more encryption key 222. The SIM ID 216 may be included to uniquely identify an associated client 102. The SIM ID 216 may also be configured to be provided to a service provider 104 to obtain one or more service 106(*n*) such as voice data 106(1) and/or other exemplary wireless services 106(*n*) as depicted in FIG. 2. A user of mobile handset 102(1) may select particular content 112 having a corresponding service ID 220 via communication module 116 which may incorporate browser functionality, or via a mini browser provided with the content viewer module 118. The service ID 220 of the selected content is then provided in the request 218. For example, the user may select content from a list of available titles, content packages and so forth which may be viewed via a browser. A variety of other techniques for content selection are also contemplated. An encryption key 222 such as a public key may be obtained from memory 208 and provided with the request 218 to enable encryption of a response to the request 218 which includes the requested license 226.

The request is then communicated to a service provider via the wireless data network (block 404). For instance, a request 218 described in FIG. 2 may be formed via a client 102 as in FIG. 1 and may be communicated via the network 108 to a service provider 102.

A response to the request is received from the service provider which includes a license having a subscriber identity and one or more keys to decrypt content received via a broadcast network (block 406). For example, a response may include a license 226 which packages a SIM ID 216' (which matches the SIM ID 216 in a corresponding request 218), a service ID 220 and one or more decryption keys 226 as in FIG. 2. The license 226 may itself be encrypted via the public key provided in the corresponding request 218.

When a client 102 attempts to receive, output, playback content 112, and so forth, the private key of the client 102 is used to decrypt the corresponding license 226. A client 102 or mobile handset 102(1) may use its private key to decrypt the license 226 to obtain the decryption key 222 which may permit output of the selected content 112.

A determination is made if the subscriber identity in the response matches a current subscriber identity of the client (block 408). In an implementation, the content viewer module 118 may be executed to selectably decrypt content based on a comparison of subscriber identity, for example comparing of SIM IDs. For instance, the SIM ID 216' in the license 226 may be compared to the current SIM ID 216 of the client 102. The SIM ID 216' typically matches the SIM ID 216 in a corresponding request 218. The SIM IDs 216', 216 may be different if the SIM ID of a client 102 device has been changed, or when an attempt is made to use the license 228 with a client other than the "licensed" client 102, e.g., an unauthorized client. When the SIM IDs do not match, the output of the corresponding content 112 may not be permitted. For instance, the content viewer module 118 may be executed to compare the SIM IDs and/or to prevent or restrict output of corresponding content 112 on the corresponding client 102 (e.g., mobile handset 102(1)) when the SIM IDs are not matched. Thus, if the SIM IDs of a license 226 and client 102 do not match, the license 226 may be unusable by the client 102. A notification may also be output when the SIM IDs do not match which indicates that the SIM IDs did not match, that the license is invalid or expired, and so forth.

When the compared SIM IDs match, then content viewer module 118 may use the decryption key 228 obtained from the license 226 to decrypt the content 112. The SIM ID comparison provides an added level of integrity and security to the secure rights protection for broadcast mobile content techniques. If a license 226 or decryption key 228 is intercepted or an attempt is made to use the decryption key 228 with another (unauthorized) device, the SIM ID comparison provides added protection which may prevent the content 112 from being output on a device which does not have a correct SIM ID 216. In this manner, the license 226 may be restricted to use with an authorized client 102. Thus, the content viewer module 118 through the SIM ID comparison (e.g., comparison of subscriber identity) may act as a gatekeeper over which content 112 may be output.

The decrypted content is output on the client (block 410). For example, the selected content 112 which has been decrypted may be output on the client 102 by being displayed on a display device 210. As noted, the decryption may occur contemporaneously with the receipt of the content 112, e.g., substantially as the content is received. Decrypted portions of content 112 may be displayed, stored in memory 208 or other storage, buffered, and so forth. In one embodiment, recorded or buffered portions of encrypted content 112 may be stored and then decrypted at a latter time, such as after a license 226 has been obtained or when the portions are selected for output. Thus, the decryption of content 112 may additionally or alternatively occur contemporaneously with the output of the content 112 (e.g., at the time of playback), such as decryption of one or more portions at or near the time of display of the portion on the display device 220.

Figure 5:
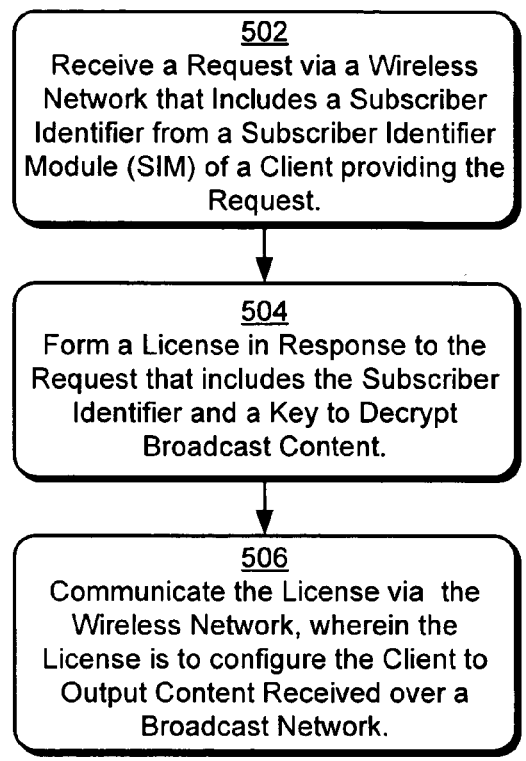
FIG. 5 is a flow diagram of an exemplary procedure in which a content license is issued in accordance with one or more embodiments.

FIG. 5 is a flow diagram of an exemplary implementation 500 of a procedure in accordance with one or more embodiments. A request is received via wireless network that includes a subscriber identity from a subscriber identity module (SIM) of a client providing the request (block 502). In this example assume a user of the mobile handset 102(1) of FIG. 2 seeks mobile television content 112, which is provided by the content provider 110 via the broadcast network 114. The content 112 for example may be a live television program, a pay-per-view movie, or even a content package including a number of programming selections or channels, such as a sports programming package. The user using the mobile handset 102(1) may execute the communication module 116 or other module through which content 112 choices may be viewed. For example, communication module may include functionality to obtain a displayable listing of available content 112 via the data network 108 and/or broadcast network 114. The user may make a choice of content 112 which has a corresponding service ID 220. The content viewer module 118 may be executed to form a request 218 for a license corresponding to the content 112, which includes a SIM ID 216 from the SIM 214 to uniquely identify the requestor. The request may also package the SIM ID 216 with, one or more service ID 220 corresponding to selected content 112, and an encryption key (222) such as a public key of the mobile handset 102(1). The request is then communicated to a wireless service provider 104(1) via the data network 108. The wireless service provider 104(1) may be configured to provide a licensing service 106(3) via data network 108 which permits a client 102 to obtain and/or output content 112 provided by a content provider 110 via a separate broadcast network 114. For instance, the wireless service provider 104(1) may execute licensing module 224 via processor core 204 to receive and respond to requests 218 from a mobile handset 102(1). Naturally, the wireless service provider 104(1) may provide one or more services 106(n) to numerous clients.

In response to the request, a license is formed which includes the subscriber identity and a key to decrypt broadcast content (block 504). For example, when a request 218 is received, the licensing module 224 may make a determination whether the requesting mobile handset 102(1) is currently subscribed to the requested content 112. Storage 122, for example, may maintain subscriber records (e.g., a subscriber database) for service, billing, client profiles and so forth. The subscriber database may include a variety of subscriber data 124 and/or license data 126. The submitted SIM ID 216 and service ID 220 may be checked against records in the database such as subscriber data 124 and/or license data 126 to determine if the mobile handset 102(1) is currently subscribed to the requested content 112.

When the mobile handset 102(1) is not currently subscribed to the requested content 112, then the submitted SIM ID 216 and service ID 220 from the request 218 may be packaged into a record with may be stored in storage 122 of the service provider 104. The subscriber records may be referenced for future licensing transactions and for other purposes such as billing, technical support, customer service, and so forth. Additionally, the licensing module 224 may be executed to form a corresponding license 228. When the mobile handset 102(1) is currently subscribed to the requested content 112, then licensing module 224 may proceed directly to forming a corresponding license 228, without creating a subscriber record.

To form the license 228, licensing module 224 may package one or more decryption keys 228 which correspond to the requested content 112, with the SIM ID 216 from the request 218 and the service id 220. The SIM ID in the license is referred to as SIM ID 216' to distinguish it from the SIM ID 216 maintained in a SIM 214 of a client 102. The encryption key 222 provided in the request 218 may be used to encrypt the license for secure communication of the decryption keys 228 to the requesting client 102. In the continuing example, the wireless service provider 104(1) may form a license 226 which corresponds to the selected mobile television content 112 such as a live broadcast of a television program selected by a user of the mobile handset 102(1). The license 226 may be based on a service id 220 submitted in the request 218 and may also be matched to the requesting mobile handset 102(1) via the SIM ID 216 submitted in the request 218.

The license is communicated to the client via the wireless network, wherein the license is to configure the client to output content received over a broadcast network (block 506). For instance, the wireless service provider 104(1) communicates the license 226 to the mobile handset 102(1) via the data network 108. Upon receipt of the issued license 226, the mobile handset 102(1) may utilize the license 226 to output corresponding content 112. This may include using a private key to decrypt the license 226 and to obtain the decryption keys 228 from the license 226 Then, the one or more one or more decryption keys 228 may be used by a recipient (e.g., mobile handset 102(1)) of the license 226 to output content 112 received from a content provider 110 via a broadcast network 114. In the previous example, the selected live television program may be decrypted and output on the mobile handset 102(1), such as display of a live news broadcast on display device 210 of the mobile handset 102(1).

CONCLUSION

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. An apparatus comprising:
a processor core;
a subscriber identity module (SIM) maintaining a subscriber identity that is sent to a service provider; and
a module executable via the processor core to:
form a request to be communicated to a service provider via a wireless data network that includes the subscriber identity obtained from the SIM and one key of an encryption key pair corresponding to the apparatus;
receive an encrypted response to the request that includes a license having the subscriber identity, a service identifier to indicate content that is requested, and one or more keys to decrypt content received from a content provider that is a different entity than the service provider, via a broadcast network, wherein the encrypted response is encrypted using the transmitted key of the encryption key pair corresponding to the apparatus; and
select the content by a browser using the service identifier.

2. The apparatus as recited in claim 1, wherein the content is broadcast television content.

3. The apparatus as recited in claim 1, wherein the apparatus forms at least a portion of a mobile handset.

4. The apparatus as recited in claim 1, wherein:
the license is sought from the service provider; and
the content is provided by the content provider separate from the wireless provider.

5. The apparatus as recited in claim 1, wherein the module is to:
obtain the content via the broadcast network;
retrieve the one or more keys to decrypt content from the license;
decrypt the content utilizing the one or more keys; and
output the decrypted content.

6. The apparatus as recited in claim 1, wherein the module is to:
compare a subscriber identity of the license with the subscriber identity maintained in the subscriber identity module (SIM); and
selectively decrypt the content based on the comparison.

7. The apparatus as recited in claim 1, wherein the subscriber identity obtained from the subscriber identity module (SIM) is to enable a sender of the request to communicate the request via the wireless network.

8. The apparatus as recited in claim 7, wherein the subscriber identifier obtained from the subscriber identity module (SIM) is to also enable the sender of the request to communicate voice data via the wireless network.

9. A method comprising:
forming at a mobile handset a request for a license to be communicated via a wireless network to a service provider that maintains subscriber data of the mobile handset, wherein the request includes one key of an encryption key pair corresponding to the mobile handset to permit encryption of the license received in response to the request by a recipient of the request;
receiving the license that includes a subscriber identity module identifier of the mobile handset and a service identifier that identifies content that is requested, via the wireless network in response to the request, wherein the license configures the mobile handset to output content from a content provider that is a different entity than the service provider, received over a broadcast network that is separate from the wireless network; and
select the content by a browser using the service identifier.

10. The method as recited in claim 9, wherein the content is broadcast television content.

11. The method as recited in claim 9, wherein:
the license is sought from the service provider; and
the content is provided by the content provider.

12. The method as recited in claim 11, wherein the service provider manages the wireless network and does not manage the broadcast network.

13. The method as recited in claim 9, wherein;
the content is broadcast in encrypted form over the broadcast network; and the license is to permit decryption of the content.

14. The method as recited in claim 9, wherein:
the request includes a subscriber identity from a subscriber identity module (SIM) of the mobile handset; and
the license received by the mobile handset includes a license subscriber identity to permit a determination whether the license subscriber identity matches the subscriber identity from the subscriber identity module (SIM) of the mobile handset.

15. The method as recited in claim 14, further comprising:
determining if the license subscriber identity in the received license matches the subscriber identity from the subscriber identity module (SIM) of the mobile handset;
when the subscriber identities match, obtaining one or more keys from the license to decrypt the content and outputting the decrypted content via the mobile handset.

16. The method as recited in claim 9, wherein the license is to provide one or more keys to decrypt the content.

17. One or more non-transitory computer readable media comprising computer executable instructions, which when executed direct a server of a wireless service provider to:
receive a request from a client via a wireless data network that includes a subscriber identity from a subscriber identity module (SIM) of the client and one key of an encryption key pair corresponding to the client to permit encryption of a license received in response to the request by a recipient of the request;
form the license in response to the request that includes the subscriber identifier, a service identifier that identifies requested content, and the one key to decrypt broadcast content, wherein the service provider maintains subscriber data of the client, and the client receives content from a content provider that is a different entity than the service provider; and
select the content by a browser using the service identifier.

18. One or more non-transitory computer readable media as recited in claim 17, further comprising instructions, which when executed direct the server to communicate the license via the wireless network to the client providing the request, wherein the license is to configure the client to output the broadcast content.

19. One or more non-transitory computer readable media as recited in claim 17, wherein the broadcast content is television content provided by content provider via a broadcast network.

20. One or more non-transitory computer readable media as recited in claim 17, wherein the subscriber identity from the subscriber identity module (SIM) is to enable the client providing the request to communicate the request via the wireless data network.

21. One or more non-transitory computer readable media as recited in claim 20, wherein the subscriber identity from the subscriber identity module (SIM) is to also enable the client providing the request to communicate voice data via the wireless data network.

22. An apparatus comprising:

a processor core;

a display device; and a module executable via the processor core to:

form a request to a service provider that maintains subscriber data of the apparatus, to be communicated via a wireless data network that includes a subscriber identity obtained from a SIM and one key of an encryption key pair corresponding to the apparatus;

receive an encrypted license from the service provider, via a wireless data network, wherein the license is encrypted with a public key of the key pair associated with the apparatus transmitted in a request for the license from the apparatus, wherein the license further provides:

a subscriber identity to verify the identity of a receiving device;

a service identifier that identifies requested content indicating item, program, category, content type, or associated content; and one or more keys configured to permit decryption of encrypted television content;

receive the encrypted television content from a content provider that is a different entity than the service provider, via a broadcast network; and utilize the license to decrypt the encrypted television content for display on the display device, by selecting the content by a browser using the service identifier.

23. The apparatus as recited in claim 22, further comprising a subscriber identity module (SIM), wherein the SIM provides a subscriber identity to enable a sender of the request to obtain data including the license via the wireless data network.

24. The apparatus as recited in claim 23 further comprising one or more antennas operable to provide connections to the wireless data network and the broadcast network, wherein the SIM is to enable the one or more antennas to receive voice data service which is provided by a service provider via the wireless data network.

* * * * *